United States Patent
Khaled

(10) Patent No.: US 10,977,684 B2
(45) Date of Patent: Apr. 13, 2021

(54) GENERATING AND DISTRIBUTING DIGITAL SURVEYS BASED ON PREDICTING SURVEY RESPONSES TO DIGITAL SURVEY QUESTIONS

(71) Applicant: Qualtrics, LLC, Provo, UT (US)

(72) Inventor: Arindam Khaled, Seattle, WA (US)

(73) Assignee: QUALTRICS, LLC, Provo, UT (US)

( * ) Notice: Subject to any disclaimer, the term of this patent is extended or adjusted under 35 U.S.C. 154(b) by 0 days.

(21) Appl. No.: 16/526,250

(22) Filed: Jul. 30, 2019

(65) Prior Publication Data
US 2021/0035155 A1    Feb. 4, 2021

(51) Int. Cl.
*G06Q 30/02*    (2012.01)
*G06F 16/28*    (2019.01)

(52) U.S. Cl.
CPC ....... *G06Q 30/0245* (2013.01); *G06F 16/288* (2019.01)

(58) Field of Classification Search
CPC .................................................. G06Q 30/02
See application file for complete search history.

(56) References Cited

U.S. PATENT DOCUMENTS

| | | | | |
|---|---|---|---|---|
| 7,284,037 B2 * | 10/2007 | Kamiya | .................. | G06Q 30/02 706/45 |
| 7,418,496 B2 * | 8/2008 | Macey | .................. | G06F 40/205 709/224 |
| 2018/0247323 A1 * | 8/2018 | Sayres | ............... | G06Q 30/0203 |
| 2019/0205908 A1 * | 7/2019 | Perona | ............... | G06Q 30/0203 |

FOREIGN PATENT DOCUMENTS

JP    2002-92291 A    *    3/2002    ............ G06F 17/40

OTHER PUBLICATIONS

Salganik, Matthew J.; Levy, Karen E.C., Hellenringer, Stephane, Wiki Surveys: Open and Quantifiable Social Data Collection; May 20, 2015, PLoS One, 10(5), e0123483 (Year: 2015).*

* cited by examiner

*Primary Examiner* — Marilyn G Macasiano
(74) *Attorney, Agent, or Firm* — Keller Jolley Preece

(57) ABSTRACT

The present disclosure relates to systems, methods, and non-transitory computer readable media for generating a predicted response to a digital survey question and identifying digital survey questions to remove from a digital survey. For example, the disclosed systems can reduce the number of digital survey questions distributed as part of a digital survey by identifying and removing similar digital survey questions. In addition, the disclosed systems can generate a predicted response to an unprovided digital survey question based on determining relationships between respondents. Further, based on respondent relationships, the disclosed systems can identify digital survey questions that a respondent is likely to answer and can provide the digital survey questions to a respondent device of the respondent.

20 Claims, 12 Drawing Sheets

| | Q1 | Q2 | Q3 | Q4 |
|---|---|---|---|---|
| Resp 1 | A | B | C | D |
| Resp 2 | B | C | D | A |
| Resp 3 | C | C | A | D |
| Resp 4 | A | B | A | C |
| Resp 5 | B | B | B | A |
| New Resp | B | C | D | A |

GENERATING AND DISTRIBUTING DIGITAL SURVEYS BASED ON PREDICTING SURVEY RESPONSES TO DIGITAL SURVEY QUESTIONS

BACKGROUND

Advancements in software and hardware platforms have led to a variety of improvements in systems that provide digital surveys to respondent devices and collect survey response information based on responses to digital survey questions. For example, digital survey systems are now able to provide digital survey questions of many different question types across various platforms of respondent device types. Despite these advances however, conventional digital survey systems continue to suffer from a number of disadvantages.

For example, conventional systems often generate inaccurate survey response information by providing digital surveys with too many digital survey questions. Empirical data suggests that the longer the digital survey the less time each respondent device spends on each digital survey question. Researchers have shown that digital surveys with 30 digital survey questions take respondent devices an average of 10 minutes to complete, giving an average time spent per digital survey question of 19 seconds. On the other hand, researchers have shown that a digital survey with 1 question takes respondent devices an average of 75 seconds to complete. Based on this research, long digital surveys can result in low-quality, inaccurate digital survey responses collected via the digital surveys. However, digital surveys that are too short can result in too few responses collected and the digital surveys can therefore be less informative.

Conventional digital survey systems are also inefficient. In particular, many conventional systems inefficiently utilize computer resources such as computing time and computing power. Indeed, in an attempt to collect actionable information, conventional systems often generate and provide digital surveys with large numbers of digital survey questions. By generating, providing, and collecting responses for such large numbers of digital survey questions, these conventional systems utilize excessive amounts of computing time and computing power processing the generation, transmittal, and analysis of the digital survey questions and the corresponding responses from potentially large numbers of respondent devices (e.g., 10,000 or more). Moreover, digital surveys with such large numbers of digital survey questions require onerous numbers of respondent interactions and response time on the part of respondents completing the digital survey via respondent devices.

Additionally, conventional digital survey systems are inflexible. More specifically, conventional systems often generate and distribute digital surveys with a fixed number of digital survey questions. Indeed, for a given digital survey, many conventional digital survey systems generate a uniform set of digital survey questions to provide to each respondent device across the board. Thus, these conventional systems cannot adapt digital surveys to accommodate individual preferences of respondents or time constraints of respondents that can often result in the collection of low-quality response information or no response information, as mentioned above.

Thus, there are several disadvantages with regard to conventional digital survey systems.

SUMMARY

One or more embodiments described herein provide benefits and solve one or more of the foregoing or other problems in the art with systems, methods, and non-transitory computer readable media that reduce the number of digital survey questions for providing to respondent devices as part of a digital survey by generating predicted responses to one or more digital survey questions. In particular, the disclosed systems can generate and provide digital surveys with reduced numbers of digital survey questions without losing overall response information. To this end, the systems can capture and encode respondent attributes (e.g., behavior and preferences) and determine relationships between respondents based on respondent attributes for generating predicted responses to digital survey questions, including digital survey questions that are unanswered and/or not even provided to respondent devices. The disclosed systems can reduce the number of digital survey questions to provide to a particular respondent device by, for example, identifying and excluding a digital survey question that is within a threshold similarity of another digital survey question and/or that is unlikely to elicit a response from a given respondent.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 8 illustrates an example survey matrix including a predicted response in accordance with one or more embodiments;

DETAILED DESCRIPTION

Figure 1:
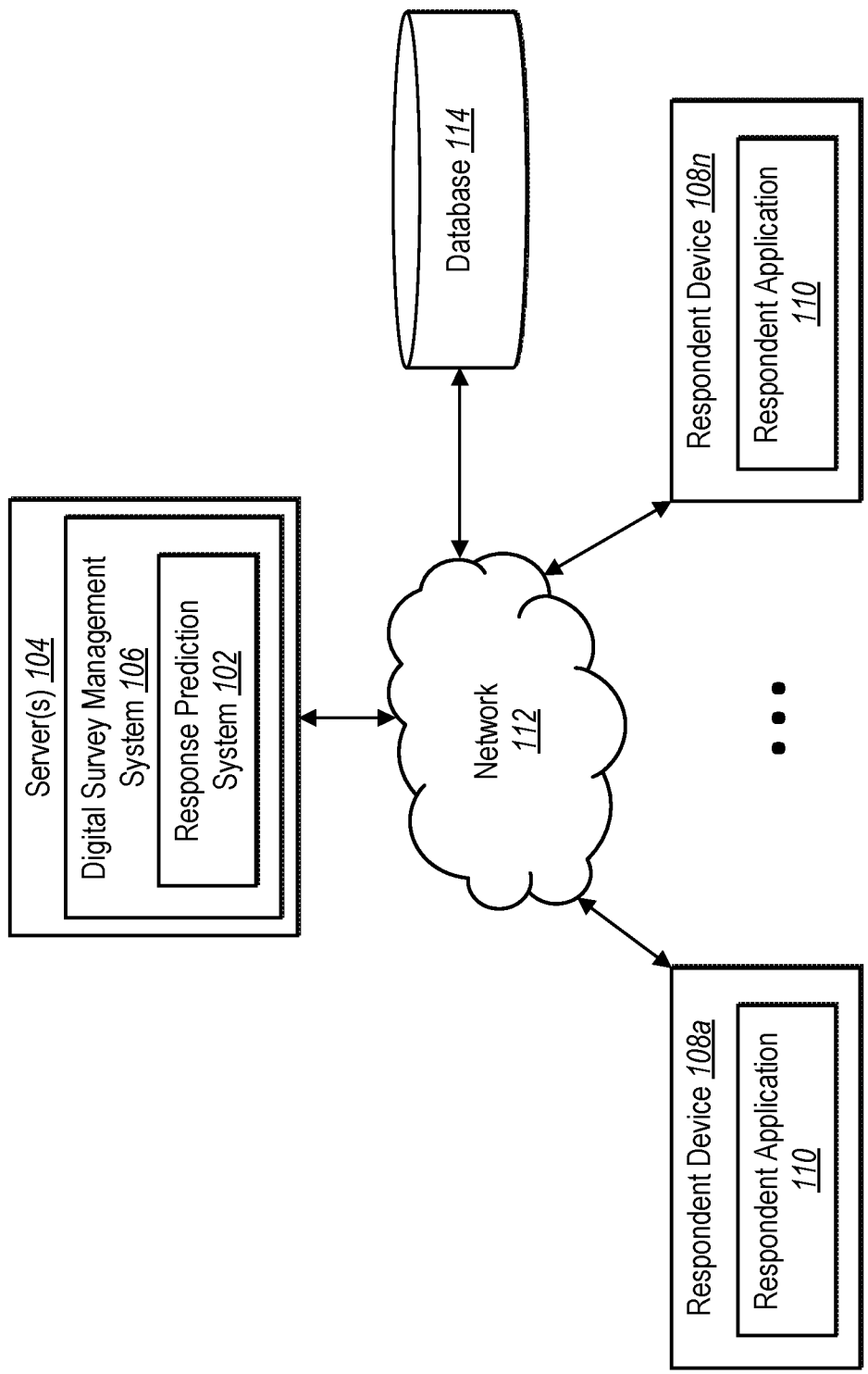
FIG. 1 illustrates an example environment for implementing a response prediction system in accordance with one or more embodiments.

One or more embodiments described herein provide benefits and solve one or more of the foregoing or other problems in the art with a response prediction system that generates predicted responses to digital survey questions based on determining relationships between respondents. In particular, the response prediction system can provide a plurality of digital survey questions and collect responses to the plurality of digital survey questions from a plurality of respondents (or respondent devices) as part of administrating a digital survey. The response prediction system can identify individual responses to digital survey questions relative to individual respondents (or respondent devices) within the plurality of respondents. Based on the responses to the digital survey questions, the response prediction system can determine relationships between respondents and utilize the determined relationships for generating predicted responses to the digital survey questions for other respondents (e.g., a new respondent). In addition, the response prediction system can further streamline administration of a digital survey by determining digital survey questions to exclude from providing to one or more respondent devices (e.g., based on predicting a response, determining the question is duplicative, or determining a respondent is unlikely to answer the question). In these or other embodiments, the response prediction system generates predicted digital survey questions that respondents are likely to answer and provides the predicted digital survey questions to a respondent device as part of a digital survey.

As mentioned, the response prediction system can generate, for a given respondent, predicted responses to digital survey questions. More specifically, the response prediction system can generate predicted responses to unanswered digital survey questions and/or digital survey questions that were not even provided to a respondent as part of a digital survey. To generate a predicted response for a digital survey question with respect to a particular respondent, the response prediction system can determine relationships between the respondent (who has not answered and/or viewed the digital survey question) and other respondents who have answered the digital survey question. For instance, the response prediction system can determine a relationship between the respondent and at least one other respondent based on responses to digital survey questions received from respondent devices associated with the respondent and the at least one other respondent. In some embodiments, the response prediction system accesses respondent attributes such as profile information, location information, and/or behavior information to determine a relationship between the respondent and the at least one other respondent.

To determine a relationship based on responses to digital survey questions, the response prediction system can receive responses to digital survey questions from a respondent device associated with the respondent (who has not answered particular survey questions) as well as a respondent device associated with the at least one other respondent (who has answered particular survey questions). Based on the received responses, the response prediction system can generate respondent vectors that represent the respondent and the at least one other respondent, respectively. Additionally, in some embodiments, the response prediction system generates respondent vectors based on respondent attributes or a combination of survey responses and respondent attributes. Thus, the response prediction system can represent a respondent as a vector (of numbers).

In these or other embodiments, to preserve computer memory and storage, the response prediction system can compress the vector without losing any significant information. To elaborate, the response prediction system can utilize a compression technique to preserve particular features (e.g., latent features) within a respondent vector while removing non-essential information, thereby reducing the computational requirements (e.g., computer memory, computer storage, and/or processing power) for processing or utilizing the respondent vector.

The response prediction system can determine a distance relationship between the respondent vectors within a vector space. In particular, the response prediction system can utilize an appropriate distance metric (e.g., a Euclidean distance) to determine relationships or differences between respondents by determining distances between corresponding respondent vectors in a vector space. Thus, the response prediction system can generate clusters of respondent vectors within a vector space that represent like-minded respondents. The response prediction system can further utilize this clustering information to streamline the digital survey process by providing digital surveys only to select respondents from respondent clusters. Indeed, the response prediction system can treat the select respondents as representatives of respective respondent clusters (e.g., by attributing their responses to other respondents within the respective clusters) to further reduce computing requirements of distributing a digital survey and processing subsequent responses. Thus, in these embodiments, the response prediction system reduces a number of digital survey questions to distribute to respondents by only distributing digital surveys to the select respondents.

In some embodiments, as part of determining relationships between respondents, the response prediction system can identify responses provided by the at least one other respondent to digital survey questions that are unanswered by and/or unprovided to the respondent and can associate the at least one other respondent's responses with the respondent as predicted responses. Thus, based on the relationship between the respondent and the at least one other respondent, the response prediction system can generate predicted responses to additional digital survey questions that have not been answered by and/or provided to the respondent device of the respondent.

To generate predicted responses, the response prediction system can generate and utilize a survey matrix that represents responses to digital survey questions relative to individual respondents (or respondent devices). Particularly, the response prediction system can generate a survey matrix by collecting responses to a plurality of digital survey questions relative to individual respondents of a plurality of respondents. In addition, the response prediction system can receive, from a particular (e.g., new) respondent, responses to a subset of digital survey questions from among the plurality of digital survey questions. Indeed, the response prediction system can receive, from a respondent device associated with the particular respondent, responses to a subset of digital survey questions that includes fewer than all of the digital survey questions of the plurality of digital survey questions. The response prediction system can utilize the responses to the subset of digital survey questions received from the respondent device of the particular respondent to determine relationships of the particular respondent with other respondents, and to ultimately predict responses to any unanswered survey questions for the particular respondent.

Indeed, the response prediction system can enable a respondent to skip a digital survey question (or a percentage of an entire digital survey), and the response prediction system can complete the digital survey for the respondent. The response prediction system can generate responses for unanswered (or unprovided) digital survey questions on-thefly (e.g., in real time or near real time) for a digital survey (e.g., a digital survey that has been previously administered to other respondents). In some embodiments, the response prediction system can generate predicted responses for digital survey questions that have existed for a period of time (e.g., after the expiration of a threshold period of time since generation and/or distribution of a digital survey and/or a digital survey question). In these or other embodiments, the response prediction system can generate predicted responses for digital survey questions immediately upon distribution or conclusion (e.g., receipt of responses for) of a digital survey.

As mentioned, the response prediction system can also identify digital survey questions to exclude from digital surveys and/or to refrain from providing to respondent devices. Indeed, the response prediction system can reduce the number of digital survey questions distributed as part of a digital survey by generating a subset of digital survey questions to provide to the respondent device of a particular respondent. For instance, the response prediction system can identify digital survey questions to remove or exclude by determining respective relevance scores for digital survey questions. The response prediction system can remove, or refrain from providing, those digital survey questions that fail to satisfy a threshold relevance score with respect to a particular respondent. In some embodiments, the response prediction system randomly selects one or more digital survey questions to exclude from a plurality of digital survey questions as part of a digital survey. In these or other embodiments, the response prediction system identifies digital survey questions to remove or exclude by determining similarity scores between digital survey questions and by removing or merging digital survey questions whose similarity scores satisfy a threshold similarity.

As also mentioned, in some embodiments the response prediction system also (or alternatively) generates predicted digital survey questions to provide to a respondent device. For example, the response prediction system can generate a predicted digital survey question that a respondent is interested in and is therefore likely to answer. In some embodiments, for instance, the response prediction system determines relevance scores for digital survey questions based on relationships between a particular respondent and other respondents as well as those digital survey questions that the other respondents have answered. By determining a close relationship between a first respondent and a second respondent, for example, and by further determining that the response prediction system has received a response from the second respondent for a given digital survey question, the response prediction system can further determine a greater relevance with respect to the first respondent (e.g., a greater likelihood that the first respondent will answer the same digital survey question).

The response prediction system provides several advantages over conventional digital survey systems. For example, the response prediction system improves accuracy over conventional systems by generating more accurate, higher-quality responses. Indeed, whereas limitations of conventional systems force survey administrators to include an excessive number of digital survey questions that results in lower-quality responses, rushed responses, or incomplete responses, the response prediction system reduces the number of digital survey questions to result in higher-quality responses, while still achieving a comparable (e.g., the same or similar) volume of responses. To achieve both higher-quality responses as well as high volume of responses, the response prediction system generates response predictions for unanswered and/or unprovided digital survey questions based on relationships between respondents, as described above.

In addition, the response prediction system improves efficiency over conventional digital survey systems. For example, the response prediction system reduces the utilization of computer resources such as computing time and computing power to create a digital survey system that is computationally more efficient than conventional systems. More specifically, the response prediction system reduces the number of digital survey questions (e.g., by 50% or more) provided to respondent devices as part of a digital survey, thereby reducing the processing requirements for generating and distributing digital survey questions and receiving corresponding responses. By reducing the number of digital survey questions distributed to respondent devices as part of a digital survey, the response prediction system further reduces the computing demands on the part of respondent devices. Indeed, whereas conventional systems require respondent devices to receive many inputs from respondents to submit responses to large numbers of digital survey questions, the response prediction system requires fewer user inputs and fewer transmittals of responses as a result of generating predicted responses for digital survey questions that are unanswered and/or unprovided.

Further, the response prediction system improves flexibility over conventional digital survey systems. Indeed, whereas many conventional systems distribute uniform sets of digital survey questions as part of digital surveys, the response prediction system generates customized, respondent-specific subsets of digital questions to provide to respondent devices based on relationships between respondents (and/or respondent attributes) and predicting which questions are most relevant to a particular respondent. For example, the response prediction system determines digital survey questions that are relevant to a respondent (e.g., that the respondent is likely to answer) as well as digital survey questions that are not relevant to the respondent. In addition, the response prediction system can determine that it can accurately predict a response to a survey question for a particular respondent, and thus simply avoid providing that survey question to the particular respondent. Thus, the response prediction system can filter out and exclude irrelevant (or less relevant) digital survey questions and include relevant digital survey questions to tailor digital surveys to individual respondents in a more personalized manner for the respondent, and in a manner that collects the most needed information for the survey administrator.

As illustrated by the foregoing discussion, the present disclosure utilizes a variety of terms to describe features and benefits of the response prediction system. In particular, the term "digital survey question" refers to a digital prompt provided to a respondent device to obtain input. For example, a digital survey question can include text (or audio or video) that request information from a respondent in the form of a response. A digital survey question can have a question format, for example, a multiple choice question, a slider question, an open-ended text question, a ranking question, a scoring question, a summation question, a demographic question, a dichotomous question, a differential question, a cumulative question, a dropdown selection question, a matrix question, a net promoter score (NPS) question, or a heat map question (among others).

Relatedly, the term "response" refers to digital information provided to answer a digital survey question. For example, a response can include an input provided by a respondent via a respondent device to answer to a digital survey question having one of the above question formats. Indeed, a response can include a selection of a multiple-choice option, an input of freeform text, an arrangement of items in a ranked list, a slide of an indicator along a slider bar, or some other form of input.

As mentioned, the response prediction system can generate a predicted response for a digital survey question based on relationships between respondents. As used herein, the term "predict" or "predicted" when used as an adjective or modifier (e.g., a predicted response or a predicted digital survey question), refers to a computer generated prediction or inference made by the response prediction system based on respondent information. For example, a predicted response can include a response that is not necessarily received from a respondent device but that is generated or inferred based on responses to other digital survey questions and/or respondent attributes. Along similar lines, a predicted digital survey question can include to a digital survey question that is not yet provided to a respondent device but that the response prediction system determines is relevant to a respondent associated with the respondent device.

Relatedly, the term "respondent attribute" refers to a characteristic or feature of a respondent or a respondent device. For example, a respondent attribute can include profile information associated with a respondent such as a profile name, an age, a gender, an occupation, an area of business, and/or an address. A respondent attribute can also (or alternatively) include a current location of a respondent device, a previous location of a respondent device, and/or a type of respondent device (e.g., a mobile device, a web-based device, or a desktop device). In some embodiments, and in accordance with privacy settings, a respondent attribute can include respondent behavior such as an indication of affinity (e.g., a "like") of a particular topic on social media, internet purchases, browsing and/or viewing history, and/or a digital survey response history.

As mentioned, to generate a predicted response, the response prediction system can generate a survey matrix based on responses to digital survey questions received from respondent devices. As used herein, the term "survey matrix" refers to a matrix that associates or correlates responses with digital survey questions that prompted the responses and with respondents who provided the responses. For example, a survey matrix can include a number of rows and a number of columns, where each row can represent an individual respondent and each column can represent an individual digital survey question (or vice-versa). The response prediction system can fill in the survey matrix by generating, for each cross-section of a row and a column, an indication of a response to the respective digital survey question received from a respondent device of the respective respondent.

As briefly discussed above, the response prediction system can determine a relevance score for a digital survey question with respect to a particular respondent. As used herein, the term "relevance score" (or simply "relevance") refers to a degree of relevance or pertinence of a digital survey question in relation to a respondent. A relevance score can indicate a likelihood of receiving a response from a respondent device associated with a particular respondent. In some embodiments, the response prediction system determines a relevance score for a digital survey question based on relationships between respondents and/or based on respondent attributes.

In addition, the response prediction system can determine a similarity score between two digital survey questions and/or two responses. As used herein, the term "similarity score" (or simply "similarity") refers to a degree of likeness or similarity between two or more objects. For example, a similarity score can indicate a degree of similarity between two digital survey questions, two responses, or two respondents. A similarity score can include a measure of closeness between two vectors (e.g., respondent vectors or other feature vectors) in a vector space, where the vectors include latent features that represent observable features of a respondent (or a digital survey question or a response) as well as unobservable (e.g., deep) features. Indeed, the response prediction system can generate a cluster of respondent vectors (or digital survey question vectors or response vectors) that indicates a group of respondents (or digital survey questions or responses) within a threshold distance of one another in vector space. A similarity score can indicate a likelihood that a digital survey question will elicit redundant (or similar) responses from two or more respondents and/or can indicate a likelihood that two responses are redundant. In some embodiments, the response prediction system determines whether to provide or remove digital survey questions based on similarity scores. In these or other embodiments, a similarity score corresponds to a distance between two or more vectors in a vector space (e.g., digital survey question vectors, response vectors, or respondent vectors).

Additional detail regarding the response prediction system will now be provided with reference to the figures. For example, FIG. 1 illustrates a schematic diagram of an example environment for implementing a response prediction system 102 in accordance with one or more embodiments. An overview of the response prediction system 102 is described in relation to FIG. 1. Thereafter, a more detailed description of the components and processes of the response prediction system 102 is provided in relation to the subsequent figures.

As shown in FIG. 1, the environment includes server(s) 104, respondent devices 108a-108n, a database 114, and a network 112. Each of the components of the environment can communicate via the network 112, and the network 112 may be any suitable network over which computing devices can communicate. Example networks are discussed in more detail below in relation to FIGS. 11-12.

As mentioned, the environment includes the respondent devices 108a-108n (with "n" representing any number of respondent devices). In particular, a respondent device of the respondent devices 108a-108n can be one of a variety of computing devices, including a smartphone, a tablet, a smart a television, a desktop computer, a laptop computer, a virtual reality device, an augmented reality device, or some other computing device as described in relation to FIGS. 11-12. The respondent devices 108a-108n can send and receive information for digital surveys such as digital survey questions and responses to digital survey questions. The respondent devices 108a-108n can present, via survey graphical user interfaces, digital survey questions and can receive respondent input for responses in the form of touch input, keyboard input, mouse input, and/or voice input.

As further illustrated in FIG. 1, the respondent devices 108a-108n include a respondent application 110 that can present a digital survey interface whereby a respondent can view and respond to digital survey questions. The respondent application 110 may be a web application, a native application installed on the respondent devices 108a-108n (e.g., a mobile application, a desktop application, etc.), or a cloud-based application where all or part of the functionality is performed by the server(s) 104. As mentioned, the respondent application 110 can present or display information to a respondent such as a digital survey interface including digital survey questions having a variety of formats along with interface elements for responding to digital survey questions.

As further illustrated in FIG. 1, the environment includes the server(s) 104. The server(s) 104 may generate, store, process, receive, and transmit electronic data, such as digital survey questions, responses, or respondent attributes. For example, the server(s) 104 can transmit data to the respondent devices 108a-108n to provide one or more digital survey questions via the respondent application 110. The server(s) 104 may identify (e.g., monitor and/or receive) data from the respondent devices 108a-108n in the form of responses corresponding to particular digital survey questions. In some embodiments, the server(s) 104 comprises a "cloud" server such as a digital survey server. The server(s) 104 can also comprise a digital content server, an application server, a communication server, a web-hosting server, a social networking server, a digital content campaign server, or a digital communication management server.

As shown in FIG. 1, the server(s) 104 can also include the response prediction system 102 (e.g., implemented as part of a digital survey management system 106). Although FIG. 1 depicts the response prediction system 102 located on the server(s) 104, in some embodiments, the response prediction system 102 may be implemented by (e.g., located entirely or in part) on one or more other components of the environment. For example, the response prediction system 102 may be implemented by the respondent devices 108a-108n, and/or a third-party device.

Additionally, the environment of FIG. 1 includes a database 114. The database 114 can communicate with the respondent devices 108a-108n and/or the server(s) 104 to store information such as digital survey questions, responses, and respondent attributes. For example, the database 114 can organize the information such that individual digital survey questions are associated with respective responses, respondent attributes, and respondent devices 108a-108n that provided the responses. In some embodiments, the database 114 can store one or more survey matrices associated with individual digital surveys, where each digital survey includes at least one digital survey question.

In some embodiments, though not illustrated in FIG. 1, the environment may have a different arrangement of components and/or may have a different number or set of components altogether. For example, the database 114 can be housed by the server(s) 104, the respondent devices 108a-108n, and/or separately by a third party in communication via the network 112. In addition, the respondent devices 108a-108n may communicate directly with the response prediction system 102, bypassing the network 112.

Figure 2:
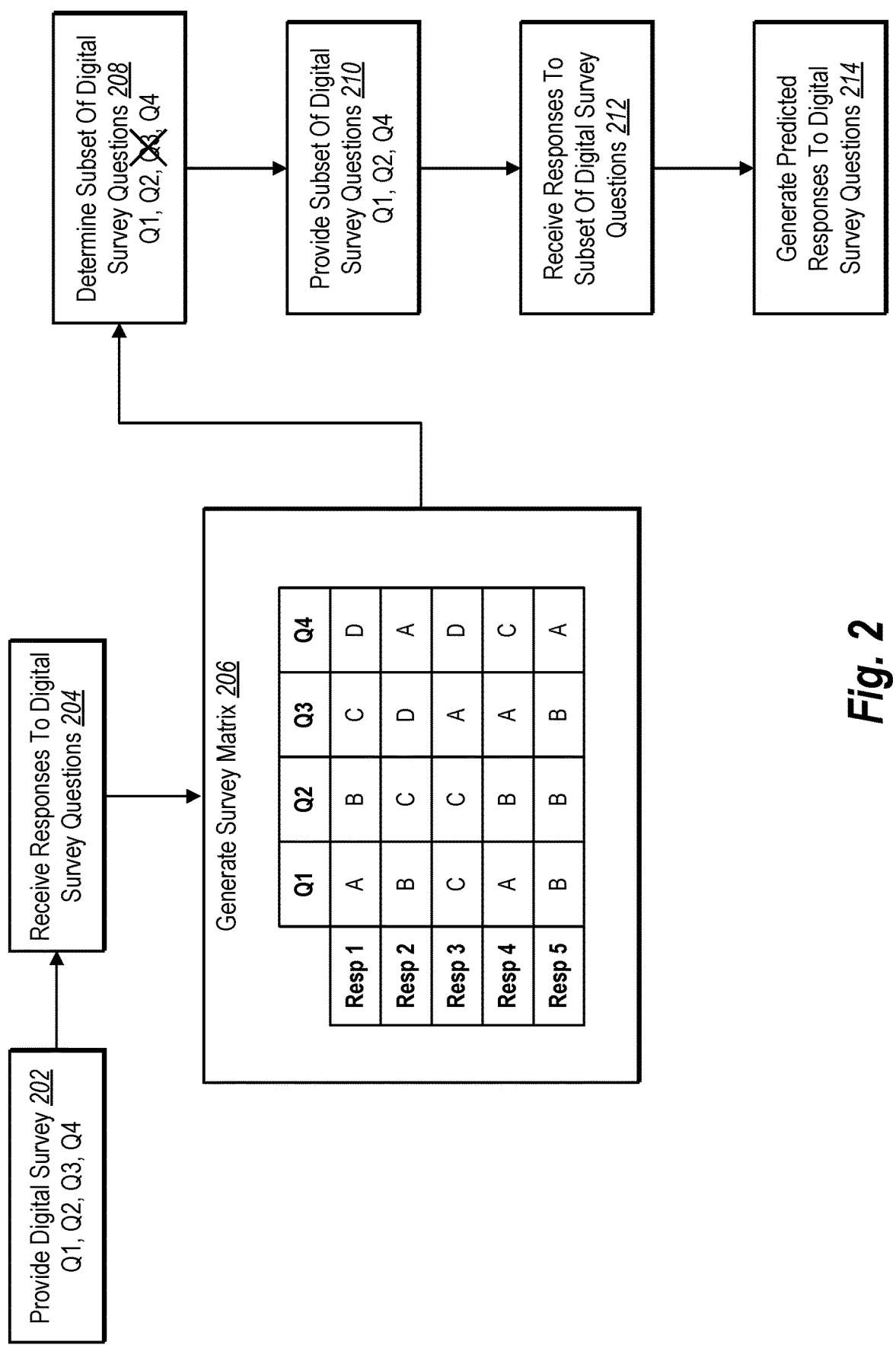
FIG. 2 illustrates an example overview of generating a predicted response to a digital survey question in accordance with one or more embodiments.

As mentioned, the response prediction system 102 can generate predicted responses to digital survey questions. FIG. 2 illustrates an example series of acts involved in generating a predicted response to a digital survey question. The description of FIG. 2 provides an overview of various acts that are involved in generating predicted responses. Thereafter, the description of the subsequent figures provides additional detail in relation to individual acts involved in generating predicted responses.

As illustrated in FIG. 2, the response prediction system 102 can perform an act 202 to provide a digital survey to a respondent device. In particular, the response prediction system 102 provides a digital survey that includes one or more digital survey questions to a respondent device. As shown, the response prediction system 102 provides a digital survey that includes four digital survey questions, represented by the nomenclature Q1, Q2, Q3, and Q4. Each of the digital survey questions Q1, Q2, Q3, and Q4 can be of a different question type or of the same question type. Indeed, Q1 may be a multiple-choice question whereby a respondent provides a response by selecting one of several options via a respondent device. In addition, Q2 may be a ranking question where a respondent provides a response by drag-and-dropping a number of items into a ranked order in accordance with a question prompt. Q3 may be the same or a different type of digital survey question, as may Q4. While FIG. 2 illustrates a particular number of digital survey questions within a digital survey, this is merely for illustrative purposes, and more or fewer digital survey questions are possible.

The response prediction system 102 provides the digital survey including the digital survey questions Q1, Q2, Q3, and Q4 to one or more respondent devices (e.g., the respondent devices 108a-108n). In turn, the response prediction system 102 further performs an act 204 to receive responses to the digital survey questions Q1, Q2, Q3, and Q4 of the digital survey. Indeed, the respondent devices 108a-108n receive user input from respondents that represent responses to one or more of the digital survey questions, and the response prediction system 102 receives such responses from the respondent devices 108a-108n. The response prediction system 102 further organizes the responses by associating the received responses with the respondent device from which the responses were received as well as the digital survey question that prompted the response.

Based on receiving the responses, the response prediction system 102 can further perform an act 206 to generate a survey matrix. In particular, the response prediction system 102 generates a survey matrix that represents responses to digital survey questions received from respondent devices associated with particular respondents. Indeed, as illustrated in FIG. 2, the response prediction system 102 generates a survey matrix that indicates responses from five different respondents (Resp 1, Resp 2, Resp 3, Resp 4, and Resp 5) for each of Q1, Q2, Q3, and Q4. For instance, the responses associated with Resp 1 are A, B, C, and D for each of Q1, Q2, Q3, and Q4, respectively. Similarly, the responses associated with Resp 2 are B, C, D, and A for Q1, Q2, Q3, and Q4, respectively. As shown, the response prediction system further receives responses for Resp 3, Resp 4, and Resp 5 as well. While the survey matrix illustrated in FIG. 2 depicts responses in the form of letters A, B, C, and D, this is merely an example, and responses may have a variety of formats, as described above. As described in further detail below, the response prediction system 102 utilizes the survey matrix to generate predicted responses to digital survey questions for one or more respondents.

As further illustrated in FIG. 2, the response prediction system 102 can perform an act 208 to determine a subset of digital survey questions. Indeed, as mentioned above, the response prediction system 102 reduces the number of digital survey questions to provide to respondent devices, and the response prediction system 102 does so by determining subsets of digital survey questions from larger sets or pluralities of digital survey questions. To determine a subset of digital survey questions, the response prediction system 102 identifies digital survey questions to exclude or remove from a plurality of digital survey questions (e.g., the plurality of digital survey questions that were provided via the act 202 as part of the original digital survey). Thus, by excluding one or more digital survey questions from a digital survey, the response prediction system 102 generates a modified digital survey that includes a subset of the digital survey questions that were part of the original digital survey. In some embodiments, the response prediction system 102 does not remove digital survey questions from a digital survey but rather refrains from providing digital survey questions that are not within a determined subset of digital survey questions. Thus, upon generating predicted responses to digital survey questions for a respondent, the response prediction system 102 determines such predicted responses for digital survey questions that are part of the digital survey but that are not part of the subset of digital survey questions provided to a respondent device associated with the respondent.

The response prediction system 102 identifies digital survey questions to exclude utilizing one or more methods. In some embodiments, the response prediction system 102 randomly selects one or more digital survey questions to remove from a digital survey. In these or other embodiments, the response prediction system 102 identifies digital survey questions that are within a threshold similarity of other digital survey questions. Based on identifying a digital survey question that is within a threshold similarity of another digital survey question, the response prediction system 102 removes or excludes the digital survey question. In some embodiments, the response prediction system 102 effectively merges two similar digital survey questions (i.e., two digital survey questions that are within a threshold similarity) while still maintaining response information for both. For example, the response prediction system 102 merges digital survey questions by providing only a first similar digital survey question (and excluding or refraining from providing a second similar digital survey question) and generating a predicted response for the second similar digital survey question based on responses to the first digital survey question.

To additionally (or alternatively) exclude digital survey questions, in one or more embodiments, the response prediction system 102 identifies digital survey questions that result in responses that are within a threshold similarity of responses from other digital survey questions. For example, the response prediction system 102 determines similarity scores associated with responses to different digital survey questions and identifies digital survey questions that result in similar responses (i.e., responses within a threshold similarity). The response prediction system 102 further excludes or removes one of the digital survey questions that result in similar responses (e.g., the similar responses include redundant response information). In some embodiments, the response prediction system 102 merges the digital survey questions that result in similar responses by excluding one or more of the digital survey questions and generating predicted responses for the excluded digital survey questions.

In these or other embodiments, the response prediction system 102 also (or alternatively) identifies digital survey questions that fail to satisfy a relevance threshold in relation to a respondent. In particular, the response prediction system 102 determines relevance scores for digital survey questions in relation to particular respondents based on relationships with other responses. For example, the response prediction system 102 identifies, for a particular respondent, relevant digital survey questions (i.e., digital survey questions whose relevance scores satisfy a relevance threshold) as digital survey questions that respondents with close relationships to the particular respondent have answered. On the other hand, the response prediction system 102 identifies irrelevant digital survey questions (i.e., digital survey questions whose relevance scores fail to satisfy a relevance threshold) as digital survey questions that respondents with close relationships to the particular respondent have not answered.

As mentioned, based on identifying digital survey questions to exclude, the response prediction system 102 removes one or more digital survey question. Indeed, as shown in FIG. 2, Q3 is crossed out within the box of act 208 to indicate that, for a particular respondent, the response prediction system 102 determines to remove or refrain from providing Q3. Additional detail regarding identifying digital survey questions to exclude or remove from a digital survey is provided below with reference to FIGS. 5-7.

As illustrated in FIG. 2, the response prediction system 102 can further perform an act 210 to provide a subset of digital survey questions. In particular, the response prediction system 102 provides the subset of digital questions that results from removing one or more digital survey questions as part of the act 208. For example, the response prediction system 102 identifies a new respondent and provides a modified digital survey question including the subset of digital survey questions (e.g., Q1, Q2, and Q4) to a respondent device associated with the new respondent.

Additionally, the response prediction system 102 can perform an act 212 to receive responses to the subset of digital survey questions (e.g., Q1, Q2, and Q4). In particular, the response prediction system 102 receives a response to Q1, a response to Q2, and a response to Q4 that the new respondent provides via a respondent device. The response prediction system 102 can receive responses in that correspond to the type of digital survey question, such a multiple-choice selections, text responses, ranked lists, placements of slider elements, etc.

As further illustrated in FIG. 2, the response prediction system 102 can perform an act 214 to generate predicted responses to digital survey questions. More specifically, the response prediction system 102 predicts, for a given respondent, responses to digital survey questions that are not provided to a respondent device of the given respondent. For example, the response prediction system 102 receives responses from a new respondent for Q1, Q2, and Q4, and the response prediction system 102 generates a predicted response to Q3. To generate the predicted response to Q3, the response prediction system 102 utilizes the survey matrix to determine relationships between the new respondent and one or more of Resp 1, Resp 2, Resp 3, Resp 4, and Resp 5. Based on the relationships, in some embodiments the response prediction system 102 identifies a closest respondent to the new respondent and generates a predicted response for Q3 to match the response to Q3 received from the closest respondent.

Figure 3:
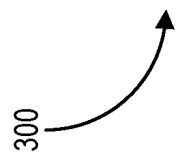
FIG. 3 illustrates an example survey matrix in accordance with one or more embodiments.

As mentioned, the response prediction system 102 generates a survey matrix based on responses to a plurality of digital survey questions received from a plurality of respondents. FIG. 3 illustrates an example survey matrix 300 that indicates responses to digital survey questions as part of a digital survey. As shown, the survey matrix 300 indicates respective responses for Q1, Q2, Q3, and Q4 for Resp 1, Resp 2, Resp 3, Resp 4, Resp 5, and a new respondent ("New Resp"). As shown, the response prediction system 102 receives responses to Q1, Q2, and Q4 from the new respondent and does not receive a response to Q3. In some embodiments, the response prediction system 102 distributes each of Q1, Q2, Q3, and Q4 to all six respondents (Resp 1, Resp 2, Resp 3, Resp 4, Resp 5, and New Resp) and receives the responses as shown in the survey matrix 300. In other embodiments, the response prediction system 102 first distributes each of Q1, Q2, Q3, and Q4 to Resp 1, Resp 2, Resp 3, Resp 4, and Resp 5, then identifies Q3 as a digital survey question to refrain from providing to the new respondent, and only provides Q1, Q2, and Q4 to the new respondent.

In these or other embodiments, the response prediction system 102 receives responses to Q1, Q2, and Q4 from a respondent device associated with the new respondent. Based on the received responses (as well as the responses received from the other respondents), the response prediction system 102 generates the survey matrix 300 that the response prediction system 102 utilizes to determine relationships between respondents. To elaborate, the response prediction system 102 determines relationships between the new respondent and other respondents of Resp 1, Resp 2, Resp 3, Resp 4, and Resp 5 by comparing vectors associated with the respondents. For example, the response prediction system 102 generates vectors (e.g., feature vectors) that represent the respondents and determines distances between the vectors within a vector space. The response prediction system 102 can utilize the distance between respondent vectors to indicate a closeness or strength of a relationship between respondents.

Figure 4:
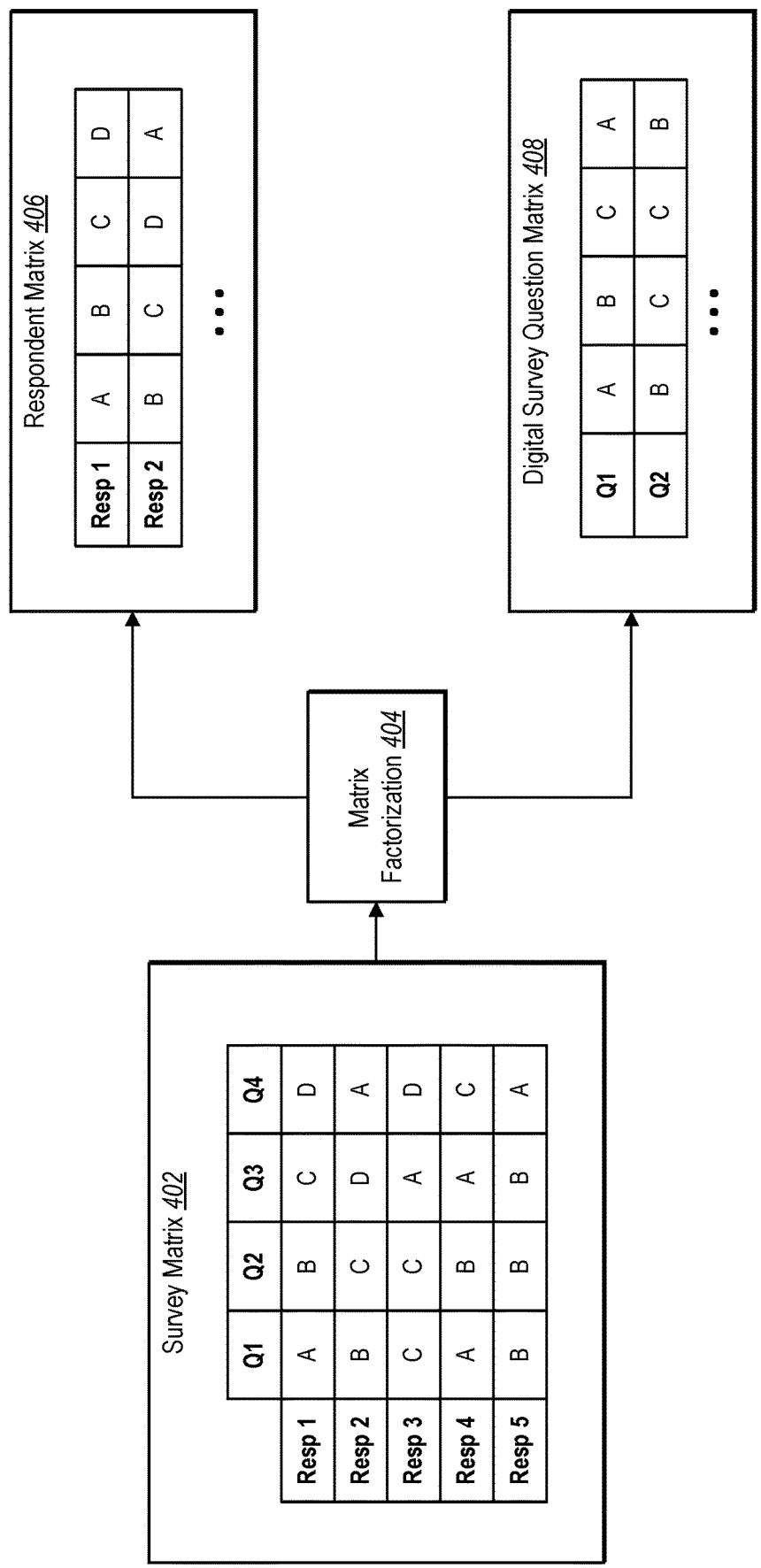
FIG. 4 illustrates method of generating a respondent matrix and a digital survey question matrix from a survey matrix in accordance with one or more embodiments.

FIG. 4 illustrates an example method by which the response prediction system 102 analyzes a survey matrix 402 (e.g., the survey matrix 300) to determine relationships between respondents. In addition, FIG. 4 further illustrates how the response prediction system 102 isolates digital survey question information to analyze for identifying or determining which digital survey questions to provide to a respondent (e.g., the New Resp) and which digital survey questions to refrain from providing to the respondent. Indeed, as shown, the response prediction system 102 utilizes a matrix factorization 404 to decompose the survey matrix 402 into a respondent matrix 406 and a digital survey question matrix 408.

To elaborate, the response prediction system 102 implements the matrix factorization 404 by utilizing one or more algorithms (e.g., matrix feeding algorithms and/or neural network algorithms) such as a non-negative matrix factorization (e.g., using TensorFlow), Funk Singular Value Decomposition ("SVD"), SVD++, and/or asymmetric SVD. In particular, the response prediction system 102 decomposes a user-item interaction matrix (e.g., the survey matrix 402) that represents interactions between users (i.e., respondents) and items (i.e., digital survey questions) into two lower-dimensionality rectangular matrices. The algorithm(s) attempt to fill in the respective matrices to supplement missing data based on the description provided below with reference to FIGS. 5-7.

For example, the response prediction system 102 generates a first matrix (i.e., the respondent matrix 406) from the respondent rows of the survey matrix 402 (where each row represents an individual respondent vector), and the response prediction system 102 generates a second matrix (i.e., the digital survey question matrix 408) from question columns of the survey matrix 402 (where each column represents an individual digital survey question vector). Thus, the response prediction system 102 represents the response information of the survey matrix 402 within a lower-dimensional latent space. Indeed, the response prediction system 102 generates the respondent matrix 406 including the responses A, B, C, and D within a first respondent vector representing Resp 1 and further including the responses B, C, D, and A within a second respondent vector representing Resp 2. Likewise, the respondent matrix 406 includes respondent vectors for each of the respondents that have provided responses to digital survey questions.

In some embodiments, the response prediction system 102 generates respondent vectors based on respondent attributes as well as responses to digital survey questions. For example, the response prediction system 102 generates the respondent vector representing Resp 1 to include respondent attributes in addition to the responses to Q 1, Q2, Q3, and Q4. Indeed, the response prediction system 102 generates the respondent vector for Resp 1 to include respondent attributes such as an age of Resp 1, a gender of Resp 1, an occupation of Resp 1, an address of Resp 1, a location of a respondent device of Resp 1, or some other respondent device. Similarly, the response prediction system 102 generates respondent vectors for other respondents (e.g., Resp 2, Resp 3, Resp 4, and Resp 5) to include respondent attributes with respect to the individual respondents. Thus, the response prediction system 102 generates respondent vectors to more accurately represent respondents based on responses to digital survey questions and respondent vectors.

In addition to generating the respondent matrix 406, the response prediction system 102 also generates the digital survey question matrix 408. In particular, the response prediction system 102 generates the digital survey question matrix 408 to include digital survey question vectors for each of the digital survey questions within the survey matrix 402. For example, the response prediction system 102 generates a first digital survey question vector for Q1, a second digital survey question vector for Q2, and so forth. As shown, the digital survey question vector for Q1 includes responses associated with Q1 (e.g., A, B, C, A, B), and the digital survey question vector for Q2 includes responses associated with Q2 (e.g., B, C, C, B, B). Indeed, in some embodiments, the response prediction system 102 generates the digital survey question vectors to include responses associated with respective digital survey questions.

In these or other embodiments, the response prediction system 102 generates the digital survey question vectors to include additional or alternative information. For example, the response prediction system 102 generates a digital survey question vector to include digital survey question attributes such as a digital survey question type (e.g., multiple-choice, ranking, etc.), a subject matter of the digital survey question, a target audience (e.g., age, gender, occupation, or other respondent attributes of target respondents) of the digital survey question, and/or an average response time duration.

Figure 5:
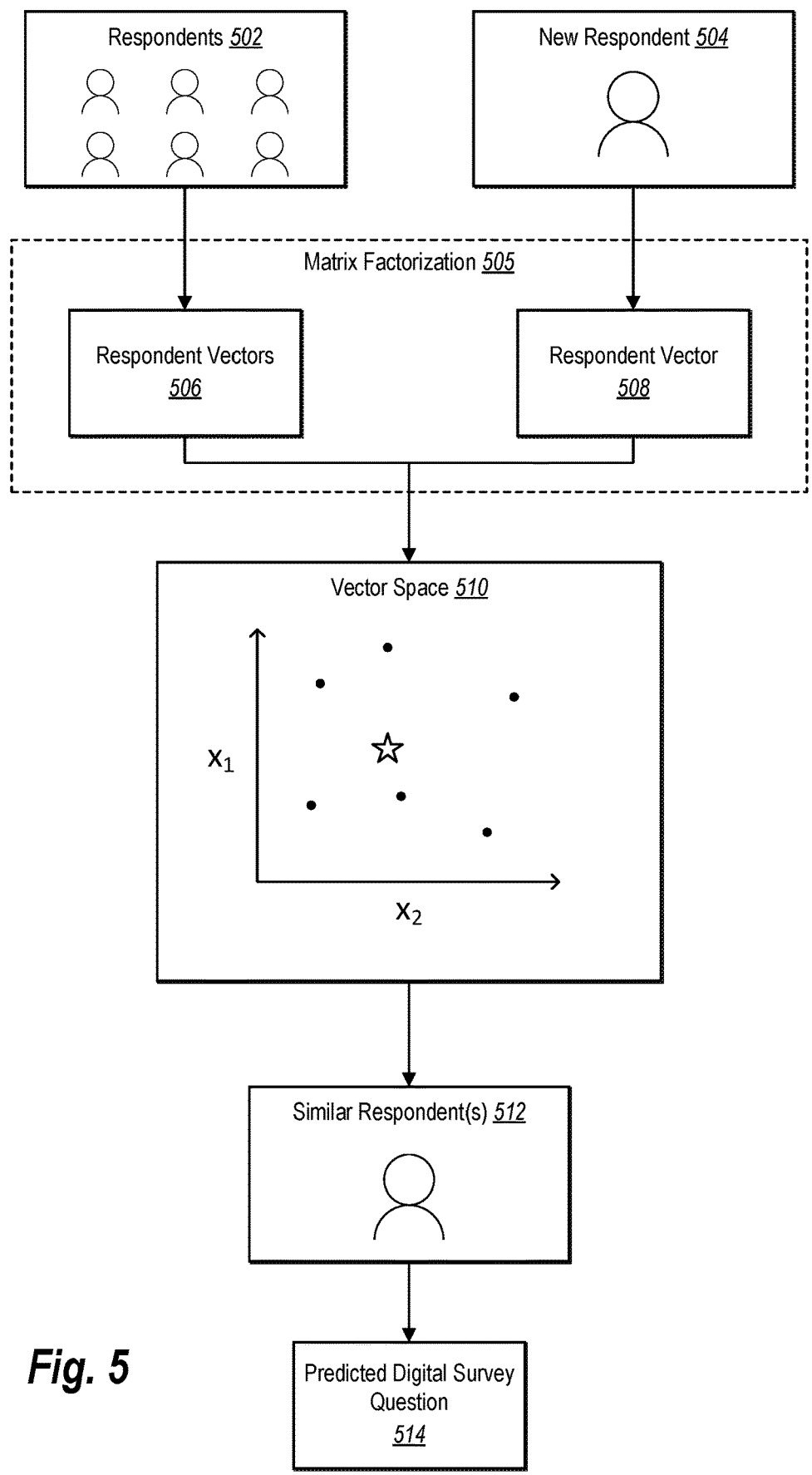
FIG. 5 illustrates an example method of determining similar respondents and generating a predicted digital survey question in accordance with one or more embodiments.

As mentioned, the response prediction system 102 can utilize respondent vectors (e.g., as part of the respondent matrix 406) to determine or identify similar respondents. FIG. 5 illustrates an example depiction of how the response prediction system 102 compares a new respondent 504 with other respondents 502 to identify one or more of the other respondents 502 that are within a threshold similarity. As shown in FIG. 5, the response prediction system 102 determines relationships between respondents by generating respondent vectors and determining distances between the respondent vectors.

More particularly, the response prediction system 102 generates respondent vectors 506 based on respondent attributes and/or responses associated with the respondents 502, and the response prediction system 102 further generates the respondent vector 508 based on respondent attributes and/or responses associated with the new respondent 504, as described above. For instance, the response prediction system 102 identifies the new respondent 504 as a respondent who has not answered all of the digital survey questions of a digital survey and/or who has not yet been provided one or more of the digital survey questions of the digital survey. Thus, to generate predicted responses for the new respondent 504, the response prediction system 102 determines relationships between the new respondent 504 and other respondents 502 who have answered one or more of the digital survey questions.

Indeed, as shown in FIG. 5, the response prediction system 102 utilizes one or more matrix factorization techniques to generate the respondent vectors 506 and the respondent vector 508. In addition, the response prediction system 102 compares the respondent vectors 506 to the respondent vector 508 to determine relationships between the respondent vector 508 and each of the respondent vectors 506. For example, the response prediction system 102 determines distances from the respondent vector 508 (as indicated by the star) to the respondent vectors 506 (as represented by the dots) within the vector space 510. In some embodiments, the response prediction system 102 utilizes a nearest neighbor algorithm (e.g., K-nearest neighbors) to generate numerical values for plotting respondent vectors and for determining the distances between respondent vectors. While the vector space 510 in FIG. 5 (and in FIGS. 6-7 described below) is only two-dimensional, this is merely for ease of illustration. Indeed, the vector space 510 can have a much higher dimensionality, where each dimension (e.g., $x_1$ and $x_2$) corresponds to a different feature or entry (e.g., a response or a respondent attribute) within a respondent vector.

Additionally, the response prediction system 102 identifies the similar respondent(s) 512 based on relationships between the respondent vector 508 and the other respondent vectors 506. Indeed, the response prediction system 102 identifies one or more of the respondents 502 as similar respondents with respect to the new respondent 504. For example, the response prediction system 102 compares the distances associated with each of the respondent vectors 506 in relation to the respondent vector 508 and selects a smallest distance as a closest (i.e., most similar) respondent vector from the respondent vectors 506. In other embodiments, the response prediction system 102 identifies one or more of the respondent vectors 506 that are within a threshold distance (within the vector space 510) of the respondent vector 508. Thus, the response prediction system 102 identifies one or more of the respondents 502 that are within a threshold similarity of the new respondent 504 based on comparing respective vectors in the vector space 510.

Based on determining relationships between respondents, the response prediction system 102 further generates predicted responses to digital survey questions that are not provided to a respondent device of the new respondent 504. In particular, the response prediction system 102 identifies a closest respondent to the new respondent 504 and generates predicted responses for one or more digital survey questions as responses received from a respondent device of the closest respondent. In some embodiments, the response prediction system 102 determines two or more similar respondent(s) 512 and generates predicted responses based on the responses of the similar respondent(s) 512. For instance, the response prediction system 102 weights responses of the similar respondent(s) 512 based on the distances of their corresponding respondent vectors from the respondent vector 508 and generates a predicted response based on the weighted combination of responses of the similar respondent(s) 512. Thus, the response prediction system 102 generates predicted responses to digital survey questions that are not provided to the new respondent 504.

In addition to identifying the similar respondent(s) 512 based on relationships between respondents, the response prediction system 102 can also exclude, or refrain from providing, one or more digital survey questions based on respondent relationships. Indeed, based on determining, for the new respondent 504, that the similar respondent(s) 512 did not answer a given digital survey question (e.g., by determining that no response was received from a respondent device associated with the similar respondent(s) 512), the response prediction system 102 can further determine that the new respondent 504 is also unlikely to answer. To determine whether the new respondent 504 is likely to answer, in one or more embodiments, the response prediction system 102 determines relevance scores for digital survey questions based on relationships between respondents.

To elaborate, the response prediction system 102 determines relevance scores for digital survey questions in relation to the new respondent 504 based on identifying which of the respondents 502 answered which digital survey questions and by further determining the distances of the respondent vectors 506 from the respondent vector 508 within the vector space 510. As an example, the response prediction system 102 determines a higher relevance score for a digital survey question that the similar respondent(s) 512 answered and a lower relevance score for a digital survey question that the similar respondent(s) 512 did not answer. In some embodiments, to determine a relevance score for a digital survey question, the response prediction system 102 determines whether each of the respondents 502 answered the digital survey question and weights each binary decision (1 for answered or 0 for not answered) inversely based on distances of corresponding respondent vectors 506 from the respondent vector 508. Thus, the response prediction system 102 determines higher relevance scores for digital survey questions that have more answers from closer respondents, and the response prediction system 102 determines lower relevance scores for digital survey questions that have fewer responses and/or responses from more distant respondents.

Based on determining relevance scores for digital survey questions, the response prediction system 102 identifies digital survey questions to provide a respondent device (e.g., a respondent device of the new respondent 504). In particular, the response prediction system 102 generates a predicted digital survey question 514 to provide to the new respondent 504 based on the relevance scores of the digital survey questions. Indeed, the response prediction system 102 identifies a digital survey question with a relevance score that satisfies a relevance threshold in relation to the new respondent 504 as a predicted digital survey question 514 to provide the respondent device of the new respondent 504. For example, the response prediction system 102 identifies a digital survey question that satisfies a relevance threshold as a predicted digital survey question to provide to a respondent device of the new respondent 504 because the new respondent 504 is likely to answer the digital survey question in accordance with the determination that the similar respondent(s) 512 responded to the digital survey question. In these or other embodiments, the response prediction system 102 identifies digital survey questions with relevance scores that fail to satisfy a relevance threshold as digital survey questions to refrain from providing to a respondent device of the new respondent 504 and/or to remove from a digital survey.

Figure 6:
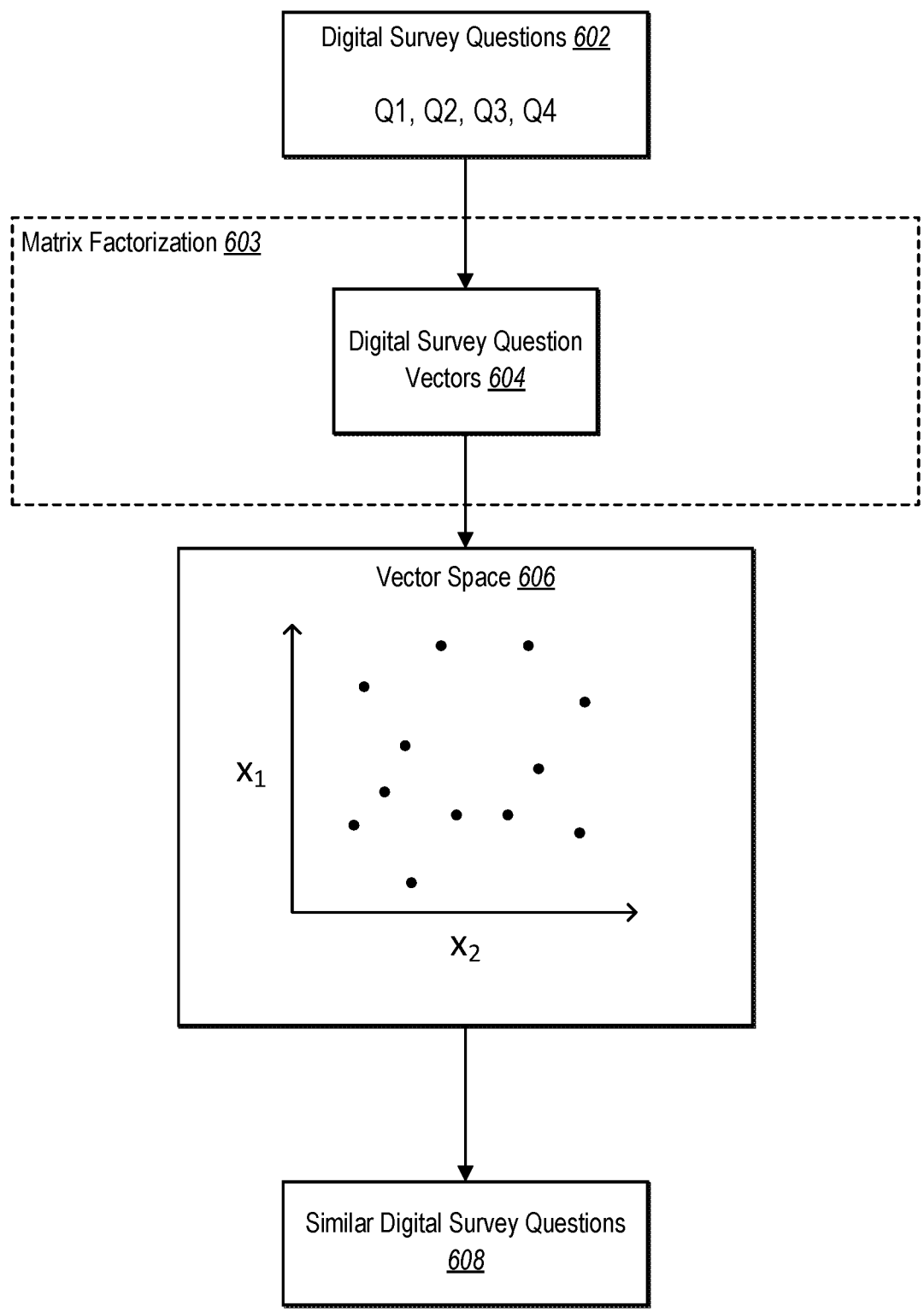
FIG. 6 illustrates an example method of determining similar digital survey questions in accordance with one or more embodiments.

As mentioned, the response prediction system 102 can determine digital survey questions to exclude or refrain from providing based on comparing digital survey questions to each other. Indeed, FIG. 6 illustrates an example method by which the response prediction system 102 compares digital survey questions to determine similarity scores between them. Based on identifying similar digital survey questions, the response prediction system 102 can merge or remove one or more similar digital survey questions to reduce the number of digital survey questions provided to a respondent device as part of a digital survey.

As illustrated in FIG. 6, the response prediction system 102 utilizes matrix factorization 603 (e.g., the matrix factorization 404 techniques described in relation to FIG. 4) to generate digital survey question vectors 604 based on the digital survey questions 602. For example, the response prediction system 102 generates the digital survey question vectors 604 to include the responses and/or digital survey question attributes as described above.

In addition, the response prediction system 102 determines distances between the digital survey question vectors 604 within a vector space 606. For example, the response prediction system 102 determines numerical values for the features (e.g., the responses and/or digital survey question attributes) that define the digital survey question vectors 604 and plots the digital survey question vectors 604 within the vector space 606. In some embodiments, the response prediction system 102 determines distances from each digital survey question vector to every other digital survey question vector. While the vector space 606 illustrates only two dimensions (e.g., $x_1$ and $x_2$), in some embodiments the vector space 606 includes many dimensions corresponding to the number of features or entries within the digital survey question vectors 604.

Further, the response prediction system 102 identifies, with respect to a given digital survey question vector, other digital survey question vectors that are within a threshold distance. By identifying digital survey question vectors that are within a threshold distance of a given digital survey question vector, the response prediction system 102 determines digital survey questions that are within a threshold similarity of the digital survey question corresponding to the given vector. Thus, the response prediction system 102 identifies or determines similar digital survey questions 608 by comparing distances of corresponding digital survey question vectors. In some embodiments, the response prediction system 102 utilizes a nearest neighbors algorithm (e.g., K-nearest neighbors) to generate numerical values for plotting digital survey question vectors and for determining the distances between digital survey question vectors.

In some embodiments, the response prediction system 102 merges one or more of the similar digital survey questions 608 by removing from a digital survey a digital survey question that is within a threshold similarity of another digital survey question. Thus, the response prediction system 102 reduces the number of digital survey questions to distribute and further reduces redundant response information gathered from digital survey questions that are substantially similar and that would likely prompt similar responses.

Figure 7:
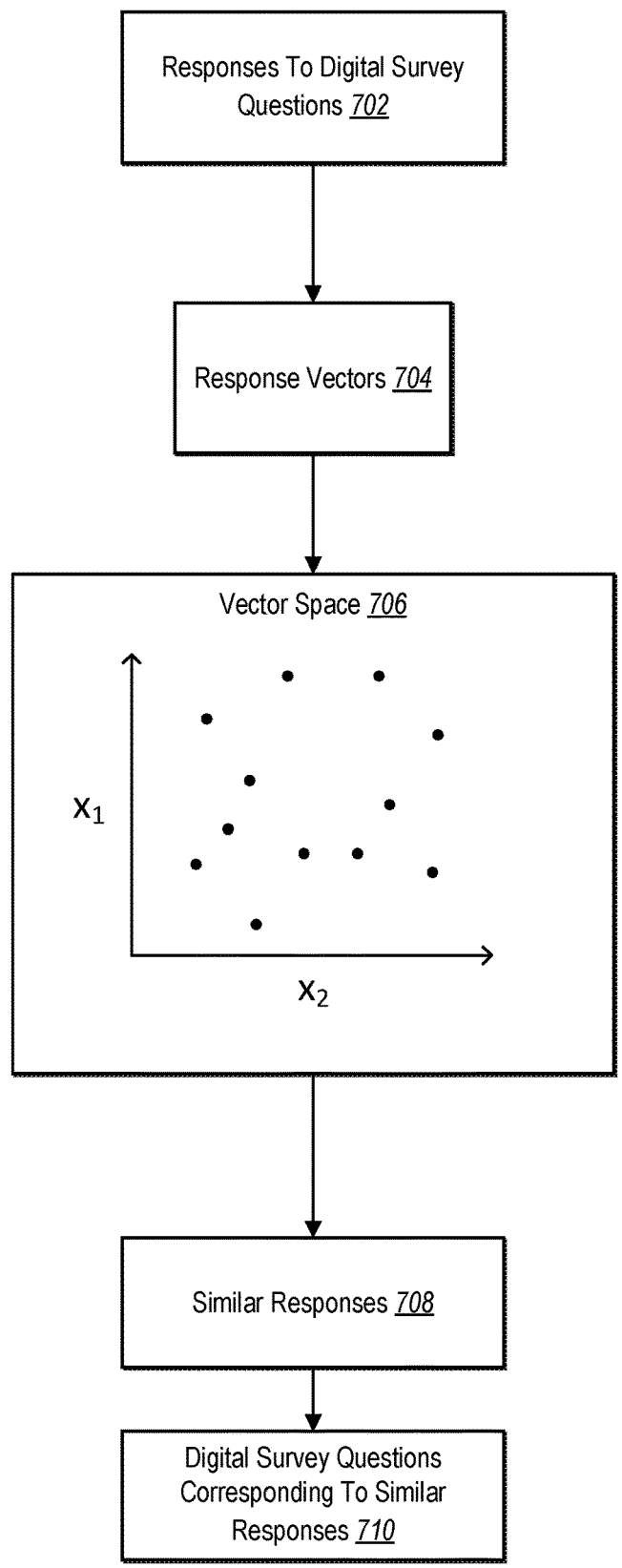
FIG. 7 illustrates an example method of determining similar responses in accordance with one or more embodiments.

As mentioned, the response prediction system 102 can further determine similarities between responses to digital survey questions to identify digital survey questions that produce redundant response information and that can therefore be removed (or not provided). Indeed, FIG. 7 illustrates an example method by which the response prediction system 102 compares responses to digital survey questions. As shown, the response prediction system 102 generates response vectors 704 based on responses to digital survey questions 702.

To elaborate, the response prediction system 102 determines response attributes associated with responses received from one or more respondents and generates the response vectors 704 based on the responses attributes. For example, the response prediction system 102 determines responses attributes such as digital survey questions associated with responses, respondent devices and corresponding respondents who provided the responses, number of characters in the responses, subject matters of the responses, and/or sentiments of the responses (e.g., positive, negative, varying degrees of positivity or negativity, or neutral). To determine a response subject matter and/or a response sentiment, the response prediction system 102 can utilize one or more language analysis techniques (e.g., a natural language processing algorithm).

Based on generating the response vectors 704 from the response attributes, the response prediction system 102 plots the response vectors 704 within a vector space 706. As above, the vector space 706 can include more than two dimensions, where each dimension (e.g., $x_1$ and $x_2$) corresponds to a different response attribute. Additionally, the response prediction system 102 compares the distances between the various response vectors 704 to determine similar responses 708. For example, the response prediction system 102 determines responses within a threshold distance of one or more other responses to indicate the similar responses 708 (e.g., responses with a similarity threshold).

In some embodiments, the response prediction system 102 further identifies digital survey questions corresponding to similar responses 710. For example, the response prediction system 102 identifies those digital survey questions that elicit or prompt the similar responses 708. In these embodiments, the response prediction system 102 further removes or refrains from providing one or more of the digital survey questions corresponding to the similar responses 710. Thus, the response prediction system 102 reduces digital survey questions to distribute without losing response information by removing digital survey questions that result in substantially similar responses.

As mentioned, the response prediction system 102 can generate predicted responses to digital survey questions. FIG. 8 illustrates a survey matrix 800 (e.g., the survey matrix 300 but including a predicted response 802) that the response prediction system 102 generates by predicting responses to the unprovided digital survey question Q3. Indeed, as shown, the response prediction system 102 generates a predicted response 802 for Q3 based on identifying similar respondents, as described above. Particularly, the response prediction system 102 identifies Resp 2 as the closest respondent to the New Resp, and the response prediction system 102 generates the predicted response 802 to match the Q3 responses (D) of Resp 2.

Figure 9:
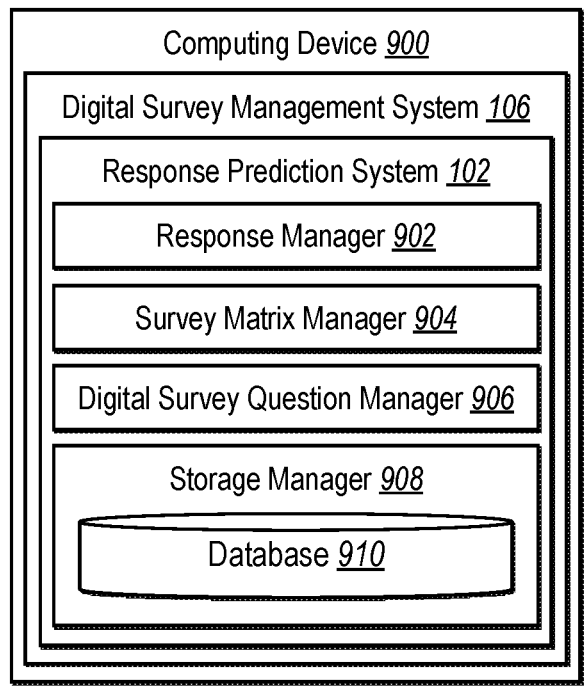
FIG. 9 illustrates a schematic diagram of a response prediction system in accordance with one or more embodiments.

Looking now to FIG. 9, additional detail will be provided regarding components and capabilities of the response prediction system 102. Specifically, FIG. 9 illustrates an example schematic diagram of the response prediction system 102 on an example computing device 900 (e.g., one or more of the respondent devices 108a-108n and/or the server(s) 104). As shown in FIG. 9, the response prediction system 102 may include a response manager 902, a survey matrix manager, a digital survey question manager 906, and a storage manager 908.

As just mentioned, the response prediction system 102 includes a response manager 902. In particular, the response manager 902 manages, receives, analyzes, identifies, and/or collects responses to digital survey questions. For example, the response manager 902 identifies and categorizes to a response in accordance with which respondent device and/or respondent profile provided the response and/or which digital survey question prompted the response. Thus, the response manager 902 communicates with the storage manager 908 to store responses in association with respondent devices/profiles and digital survey questions within the database 910. The response manager 902 further determines similarity scores between responses by accessing a survey matrix within the database 910 to generate responses vectors and distances between response vectors, as described above.

In addition, the response prediction system 102 includes a survey matrix manager 904. In particular, the survey matrix manager 904 manages, maintains, generates, or determines a survey matrix for a digital survey. For example, the survey matrix manager 904 communicates with the storage manager 908 to identify response information associated with particular digital survey questions and respondent devices that provided the responses. Thus, the survey matrix manager 904 generates a survey matrix that represents responses provided by particular respondents and corresponding to particular digital survey questions, as described above. The survey matrix manager 904 can communicate with the storage manager 908 to store a survey matrix within the database 910. Further, the survey matrix manager 904 implements matrix factorization and determines distances between respondent vectors, as further described above.

As shown, the response prediction systems 102 also includes a digital survey question manager 906. In particular, the digital survey question manager 906 manages, generates, provides, identifies, and distributes digital survey questions. For example, the digital survey question generates and distributes digital survey questions as part of a digital survey. In addition, the digital survey question manager 906 generates predicted digital survey questions and/or identifies digital survey questions to remove or refrain from providing to respondent devices, as described above. For example, the digital survey question manager 906 communicates with the storage manager 908 to access a survey matrix and determine similarity scores between digital survey questions, as described above.

In one or more embodiments, each of the components of the response prediction system 102 are in communication with one another using any suitable communication technologies. Additionally, the components of the response prediction system 102 can be in communication with one or more other devices including one or more user devices described above. It will be recognized that although the components of the response prediction system 102 are shown to be separate in FIG. 9, any of the subcomponents may be combined into fewer components, such as into a single component, or divided into more components as may serve a particular implementation. Furthermore, although the components of FIG. 9 are described in connection with the response prediction system 102, at least some of the components for performing operations in conjunction with the response prediction system 102 described herein may be implemented on other devices within the environment.

The components of the response prediction system 102 can include software, hardware, or both. For example, the components of the response prediction system 102 can include one or more instructions stored on a computer-readable storage medium and executable by processors of one or more computing devices (e.g., the computing device 900). When executed by the one or more processors, the computer-executable instructions of the response prediction system 102 can cause the computing device 1100 to perform the methods described herein. Alternatively, the components of the response prediction system 102 can comprise hardware, such as a special purpose processing device to perform a certain function or group of functions. Additionally or alternatively, the components of the response prediction system 102 can include a combination of computer-executable instructions and hardware.

Furthermore, the components of the response prediction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the response prediction system 102 may be implemented as part of a stand-alone application on a personal computing device or a mobile device.

FIGS. 1-9, the corresponding text, and the examples provide a number of different systems, methods, and non-transitory computer readable media for generating predicted responses to digital survey questions. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
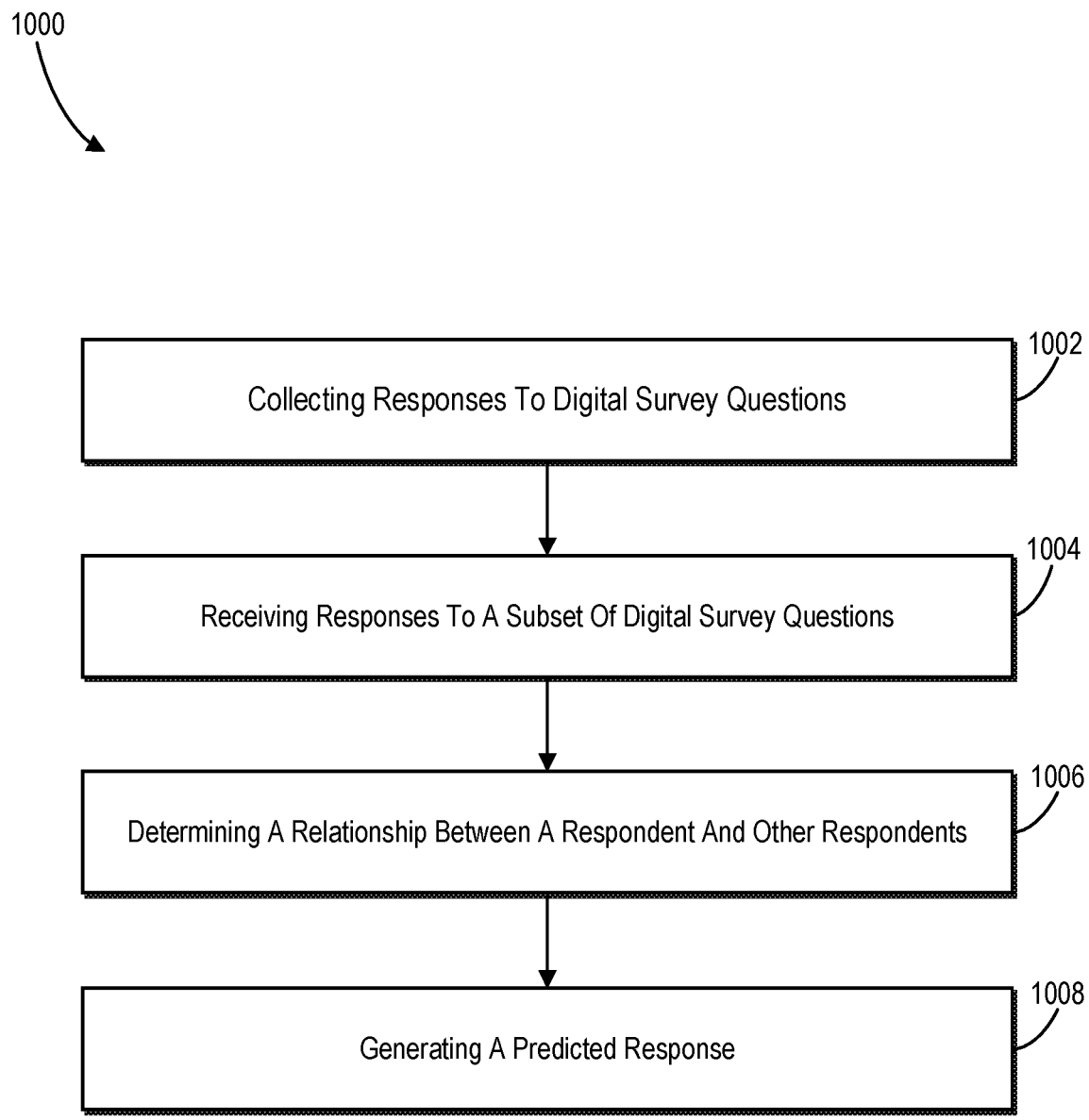
FIG. 10 illustrates a flowchart of a series of acts for generating a predicted response in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 for generating predicted digital survey questions. The series of acts 1000 includes an act 1002 of collecting responses to digital survey questions. In particular, the act 1002 can include collecting responses to a plurality of digital survey questions relative to individual respondents of a plurality of respondents. For example, the As shown, the series of acts 1000 also includes an act 1004 of receiving responses to a subset of digital survey questions. In particular, the act 1004 can include receiving, from a respondent device, one or more responses to a subset of digital survey questions within the plurality of digital survey questions.

Additionally, the series of acts 1000 can include an act 1006 of determining a relationship between a respondent and other respondents. In particular, the act 1006 can include determining, based on the one or more responses to the subset of digital survey questions, a relationship between a respondent associated with the respondent device and at least one other respondent of the plurality of respondents. The act 1006 can involve generating, based on the survey matrix, a respondent vector associated with the respondent and at least one other respondent vector associated with the at least one other respondent. The act 1006 can also (or alternatively) include determining a distance between the respondent vector and the at least one other respondent vector in a vector space. In some embodiments, the act 1006 involves identifying respondent attributes associated with the respondent and the at least one other respondent. In these or other embodiments, the act 1006 involves comparing the respondent attributes associated with the respondent with respondent attributes associated with the at least one other respondent.

As further shown, the series of acts 1000 can also include an act 1008 of generating a predicted response. In particular, the act 1008 can include generating, based on the relationship between the respondent and the at least one other respondent of the plurality of respondents, a predicted response to one or more digital survey questions within the plurality of digital survey questions and not within the subset of digital survey questions. The act 1008 can involve identifying, within the vector space, a second respondent vector that is closest to the respondent vector associated with the respondent. The act 1008 can also (or alternatively) involve determining the predicted response as a response to the one or more digital survey questions given by a second respondent associated with the second respondent vector.

The series of acts 1000 can also include an act of generating a survey matrix comprising indications of the responses to the plurality of digital survey questions relative to the individual respondents of the plurality of respondents. In some embodiments, the series of acts 1000 can include generating the subset of digital survey questions by randomly selecting a number of digital survey questions from the plurality of digital survey questions to exclude from the subset of digital survey questions. In these or other embodiments, generating the subset of digital survey questions can involve determining, in relation to the respondent, a relevance score of a digital survey question of the plurality of digital survey questions, determining that the relevance score fails to satisfy a relevance threshold, and/or, based on the relevance score failing to satisfy the threshold, excluding the digital survey question from the subset of digital survey questions.

The series of acts 1000 can also include an act of generating, based on the relationship between the respondent and the at least one other respondent, a predicted digital survey question that satisfies a threshold relevance with respect to the respondent as well as an act of providing the predicted digital survey question to the respondent device.

Generating the subset of digital survey questions can include generating a plurality of digital survey question vectors corresponding to the plurality of digital survey questions. Generating the subset of digital survey questions can also (or alternatively) include identifying, from the plurality of digital survey question vectors, a first digital survey question vector and a second digital question vector that are within a threshold similarity of each other. In the same or other embodiments, generating the subset of digital survey questions can involve, based on being within a threshold distance of each other, excluding a first digital survey question associated with the first digital survey question vector or a second digital survey question associated with the second digital survey question vector from the subset of digital survey questions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
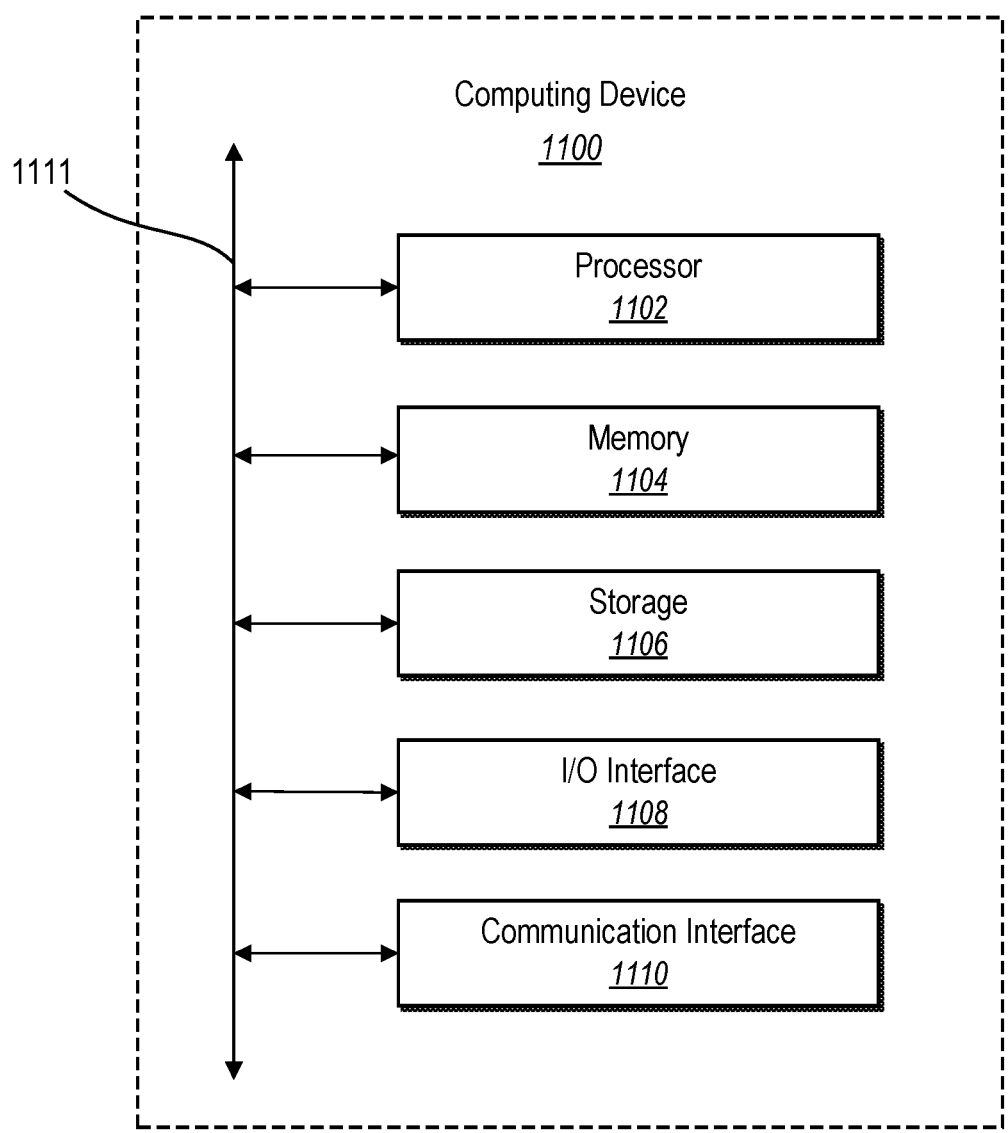
FIG. 11 illustrates a block diagram of an example computing device in accordance with one or more embodiments.

FIG. 11 illustrates, in block diagram form, an example computing device 1100 (e.g., the computing device 900, the respondent devices 108a-108n, and/or the server(s) 104) that may be configured to perform one or more of the processes described above. One will appreciate that the response prediction system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

Figure 12:
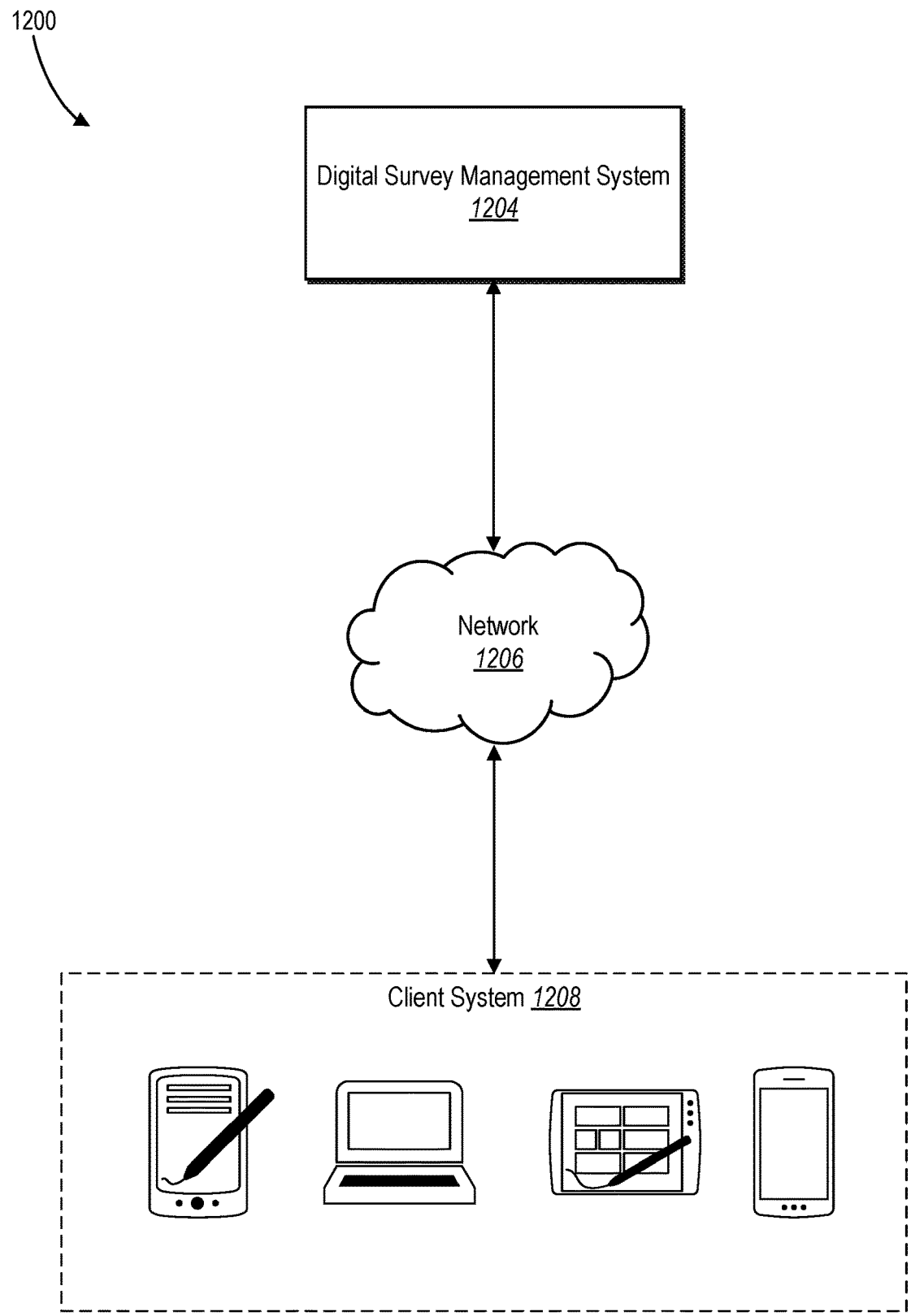
FIG. 12 illustrates an example network environment for implementing a digital survey management system in accordance with one or more embodiments.

FIG. 12 illustrates an example network environment 1200 of a digital survey management system. Network environment 1200 includes a client system 1208 and a digital survey management system 1204 (e.g., the digital survey management system 106) connected to each other by a network 1206. Although FIG. 12 illustrates a particular arrangement of client system 1208, digital survey management system 1204, and network 1206, this disclosure contemplates any suitable arrangement of client system 1208, digital survey management system 1204, and network 1206. As an example, and not by way of limitation, two or more of client system 1208, digital survey management system 1204, bypassing network 1206. As another example, two or more of client system 1208, and digital survey management system 1204 can be physically or logically co-located with each other in whole or in part. Moreover, although FIG. 12 illustrates a particular number of client systems 1208, digital survey management system 1204, and networks 1206, this disclosure contemplates any suitable number of client systems 1208, digital survey management system 1204, and networks 1206. As an example, and not by way of limitation, network environment 1200 can include multiple client system 1208, digital survey management system 1204, and networks 1206.

This disclosure contemplates any suitable network 1206. As an example, and not by way of limitation, one or more portions of network 1206 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1206 can include one or more networks 1206.

Links can connect client system 1208, and digital survey management system 1204 to communication network 1206 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links can differ in one or more respects from one or more second links.

In particular embodiments, client system 1208 can be an electronic device including hardware, software, or embedded logic components or a combination of two or more such components and capable of carrying out the appropriate functionalities implemented or supported by client system 1208. As an example, and not by way of limitation, a client system 1208 can include any of the computing devices discussed above in relation to FIG. 12. A client system 1208 can enable a network user at client system 1208 to access network 1206. A client system 1208 can enable its user to communicate with other users at other client systems 1208.

In particular embodiments, client system 1208 can include a web browser, such as MICROSOFT INTERNET EXPLORER, GOOGLE CHROME or MOZILLA FIREFOX, and can have one or more add-ons, plug-ins, or other extensions, such as TOOLBAR or YAHOO TOOLBAR. A user at client system 1208 can enter a Uniform Resource Locator (URL) or other address directing the web browser to a particular server (such as server), and the web browser can generate a Hyper Text Transfer Protocol (HTTP) request and communicate the HTTP request to server. The server can accept the HTTP request and communicate to client system 1208 one or more Hyper Text Markup Language (HTML) files responsive to the HTTP request. Client system 1208 can render a webpage based on the HTML files from the server for presentation to the user. This disclosure contemplates any suitable webpage files. As an example, and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, digital survey management system 1204 can be a network-addressable computing system that can host an online survey network. Digital survey management system 1204 can generate, store, receive, and send digital survey questions, responses, and other data such as, for example, user-profile data, concept-profile data, text data, or other suitable data related to the online survey network. Digital survey management system 1204 can be accessed by the other components of network environment 1200 either directly or via network 1206. In particular embodiments, digital survey management system 1204 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. In particular embodiments, each server can include hardware, software, or embedded logic components or a combination of two or more such components for carrying out the appropriate functionalities implemented or supported by server. In particular embodiments, digital survey management system 1204 can include one or more data stores. Data stores can be used to store various types of information. In particular embodiments, the information stored in data stores can be organized according to specific data structures. In particular embodiments, each data store can be a relational, columnar, correlation, or other suitable database. Although this disclosure describes or illustrates particular types of databases, this disclosure contemplates any suitable types of databases. Particular embodiments can provide interfaces that enable a client system 1208, or a digital survey management system 1204 to manage, retrieve, modify, add, or delete, the information stored in data store.

In particular embodiments, digital survey management system 1204 can provide users with the ability to take actions on various types of items or objects, supported by digital survey management system 1204. As an example, and not by way of limitation, the items and objects can include digital survey questions, events, or calendar entries in which a user might be interested, computer-based applications that a user can use, transactions that allow users to buy or sell items via the service, interactions with advertisements that a user can perform, or other suitable items or objects. A user can interact with anything that is capable of being represented in digital survey management system 1204 or by an external system of a third-party system, which is separate from digital survey management system 1204 and coupled to digital survey management system 1204 via a network 1206.

In particular embodiments, digital survey management system 1204 can be capable of linking a variety of entities.

As an example, and not by way of limitation, digital survey management system 1204 can enable users to interact with each other or other entities, or to allow users to interact with these entities through an application programming interfaces (API) or other communication channels.

In particular embodiments, digital survey management system 1204 also includes user-generated content objects, which can enhance a user's interactions with digital survey management system 1204. User-generated content can include anything a user can add, upload, send, or "post" to digital survey management system 1204. As an example, and not by way of limitation, a user communicates responses to digital survey management system 1204 from a client system 1208. Responses can include data such as selections, clicks, entries to digital survey questions or other textual data, location information, photos, videos, links, music or other similar data or media. Content can also be added to digital survey management system 1204 by a third-party through a "communication channel," such as a newsfeed or stream.

In particular embodiments, digital survey management system 1204 can include a variety of servers, sub-systems, programs, modules, logs, and data stores. In particular embodiments, digital survey management system 1204 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Digital survey management system 1204 can also include suitable components such as network interfaces, security mechanisms, load balancers, failover servers, management-and-network-operations consoles, other suitable components, or any suitable combination thereof. In particular embodiments, digital survey management system 1204 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between digital survey management system 1204 and one or more client systems 1208. An action logger can be used to receive communications from a web server about a user's actions on or off digital survey management system 1204. In conjunction with the action log, a third-party-content-object log can be maintained of user exposures to third-party-content objects. A notification controller can provide information regarding content objects to a client system 1208. Information can be pushed to a client system 1208 as notifications, or information can be pulled from client system 1208 responsive to a request received from client system 1208. Authorization servers can be used to enforce one or more privacy settings of the users of digital survey management system 1204. A privacy setting of a user determines how particular information associated with a user can be shared. The authorization server can allow users to opt in to or opt out of having their actions logged by digital survey management system 1204 or shared with other systems, such as, for example, by setting appropriate privacy settings. Third-party-content-object stores can be used to store content objects received from third parties. Location stores can be used for storing location information received from client systems 1208 associated with users.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer-readable medium comprising instructions that, when executed by the at least one processor, cause the system to:
   receive, from a respondent device, responses to a subset of answered digital survey questions from among a plurality of digital survey questions;
   determine, based on the responses to the subset of answered digital survey questions, a relationship between a respondent associated with the respondent device and at least one other respondent of a plurality of respondents; and
   generate, for the respondent, a predicted response to an unanswered digital survey question from among the plurality of digital survey questions based on the relationship between the respondent and the at least one other respondent.

2. The system of claim 1, further comprising instructions that, when executed by the at least one processor, cause the system to generate a survey matrix comprising indications of, for the plurality of respondents, respective responses to digital survey questions from the plurality of digital survey questions.

3. The system of claim 2, wherein the instructions cause the system to determine the relationship between the respondent and the at least one other respondent by:
   generating, based on the survey matrix, a respondent vector associated with the respondent and at least one other respondent vector associated with the at least one other respondent; and
   determining a distance between the respondent vector and the at least one other respondent vector in a vector space.

4. The system of claim 3, wherein the instructions cause the system to generate the predicted response by:
   identifying, within the vector space, a second respondent vector that is closest to the respondent vector associated with the respondent; and selecting, as the predicted response, a response given by a second respondent associated with the second respondent vector.

5. The system of claim 3, wherein the instructions cause the system to determine the relationship between the respondent and the at least one other respondent by further:
identifying respondent attributes associated with the respondent and the at least one other respondent; and
comparing the respondent attributes associated with the respondent with respondent attributes associated with the at least one other respondent.

6. The system of claim 1, further comprising instructions that, when executed by the at least one processor, cause the system to generate the predicted response to the unanswered digital survey question by generating a predicted response to a digital survey question not provided to the respondent device.

7. The system of claim 1, further comprising instructions that, when executed by the at least one processor, cause the system to select, from the plurality of digital survey questions, a digital survey question to provide to the respondent device by:
determining a relevance score for the digital survey question in relation to the respondent;
determining that the relevance score satisfies a relevance threshold; and
based on the relevance score satisfying the relevance threshold, selecting the digital survey question to provide to the respondent device.

8. The system of claim 1, further comprising instructions that, when executed by the at least one processor, cause the system to:
generate a plurality of digital survey question vectors corresponding to the plurality of digital survey questions;
identify, from the plurality of digital survey question vectors, a first digital survey question vector and a second digital survey question vector that are within a threshold similarity of each other; and
based on identifying the first digital survey question vector and the second digital survey question within the threshold similarity of each other:
select a first digital survey question associated with the first digital survey question vector to provide to the respondent device; and
exclude, from providing to the respondent device, a second digital survey question associated with the second digital survey question vector.

9. The system of claim 1, further comprising instructions that, when executed by the at least one processor, cause the system to:
generate, based on the relationship between the respondent and the at least one other respondent, a predicted digital survey question that satisfies a threshold relevance with respect to the respondent; and
provide the predicted digital survey question to the respondent device.

10. A non-transitory computer-readable medium comprising instructions that, when executed by at least one processor, cause a computer device to:
receive, from a respondent device, responses to a subset of answered digital survey questions from among a plurality of digital survey questions;
determine, based on the responses to the subset of answered digital survey questions, a relationship between a respondent associated with the respondent device and at least one other respondent of a plurality of respondents; and
generate, for the respondent, a predicted response to an unanswered digital survey question from among the plurality of digital survey questions based on the relationship between the respondent and the at least one other respondent.

11. The non-transitory computer readable medium of claim 10, further comprising instructions that, when executed by the at least one processor, cause the computer device to generate a survey matrix comprising indications of, for the plurality of respondents, respective responses to digital survey questions from the plurality of digital survey questions.

12. The non-transitory computer readable medium of claim 11, wherein the instructions cause the computer device to determine the relationship between the respondent and the at least one other respondent by:
generating, based on the survey matrix, a respondent vector associated with the respondent and at least one other respondent vector associated with the at least one other respondent; and
determining a distance between the respondent vector and the at least one other respondent vector in a vector space.

13. The non-transitory computer readable medium of claim 12, wherein the instructions cause the computer device to generate the predicted response by:
identifying, within the vector space, a second respondent vector that is closest to the respondent vector associated with the respondent; and
selecting, as the predicted response, a response given by a second respondent associated with the second respondent vector.

14. The non-transitory computer readable medium of claim 12, wherein the instructions cause the computer device to determine the relationship between the respondent and the at least one other respondent by further:
identifying respondent attributes associated with the respondent and the at least one other respondent; and
comparing the respondent attributes associated with the respondent with respondent attributes associated with the at least one other respondent.

15. The non-transitory computer readable medium of claim 10, further comprising instructions that, when executed by the at least one processor, cause the computer device to select, from the plurality of digital survey questions, a digital survey question to provide to the respondent device by:
determining a relevance score for the digital survey question in relation to the respondent;
determining that the relevance score satisfies a relevance threshold; and
based on the relevance score satisfying the relevance threshold, selecting the digital survey question to provide to the respondent device.

16. A method comprising:
receiving, from a respondent device, responses to a subset of answered digital survey questions from among a plurality of digital survey questions;

determining, based on the responses to the subset of answered digital survey questions, a relationship between a respondent associated with the respondent device and at least one other respondent of a plurality of respondents; and generating, for the respondent, a predicted response to an unanswered digital survey question from among the plurality of digital survey questions based on the relationship between the respondent and the at least one other respondent.

17. The method of claim 16, further comprising generating a survey matrix comprising indications of, for the plurality of respondents, respective responses to digital survey questions from the plurality of digital survey questions.

18. The method of claim 17, wherein determining the relationship between the respondent and the at least one other respondent comprises:

generating, based on the survey matrix, a respondent vector associated with the respondent and at least one other respondent vector associated with the at least one other respondent; and determining a distance between the respondent vector and the at least one other respondent vector in a vector space.

19. The method of claim 18, wherein generating the predicted response comprises:

identifying, within the vector space, a second respondent vector that is closest to the respondent vector associated with the respondent; and selecting, as the predicted response, a response given by a second respondent associated with the second respondent vector.

20. The method of claim 16, further comprising:

generating a plurality of digital survey question vectors corresponding to the plurality of digital survey questions;

identifying, from the plurality of digital survey question vectors, a first digital survey question vector and a second digital survey question vector that are within a threshold similarity of each other; and based on identifying the first digital survey question vector and the second digital survey question within the threshold similarity of each other:

selecting a first digital survey question associated with the first digital survey question vector to provide to the respondent device; and excluding, from providing to the respondent device, a second digital survey question associated with the second digital survey question vector.

\* \* \* \* \*